CRANDALL & CONOVER.
Velocipede.

No. 868. / 31,872.

Patented Apr. 2. 1861.

Witnesses

Inventors.

UNITED STATES PATENT OFFICE.

B. P. CRANDALL AND J. A. CONOVER, OF NEW YORK, N. Y.

CHILD'S CARRIAGE.

Specification of Letters Patent No. 31,872, dated April 2, 1861.

*To all whom it may concern:*

Be it known that we, BENJAMIN P. CRANDALL and J. A. CONOVER, both of the city, county, and State of New York, have invented a new and useful Improvement in Children's Wheel Vehicles; and we do hereby declare that the following is a full, clear, and exact description of the same, reference being had to the annexed drawings, making a part of this specification, in which—

Figure 1:
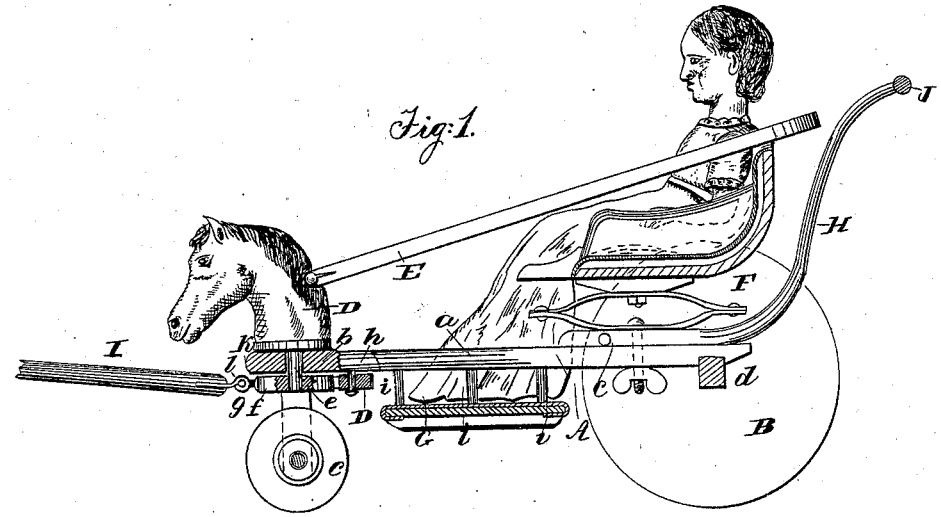
Figure 2:
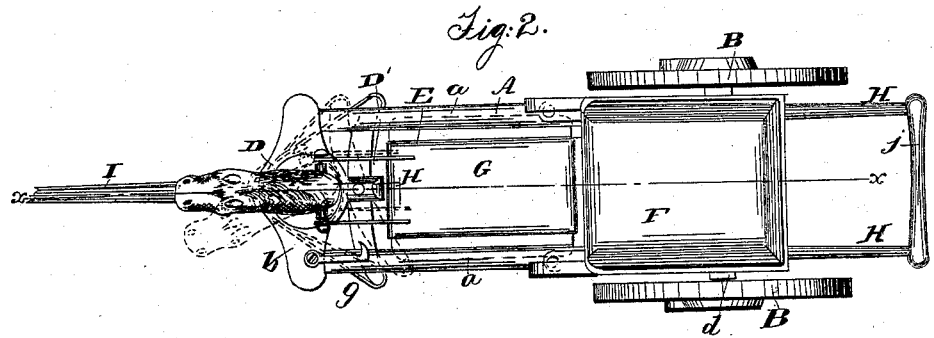
Figure 3:
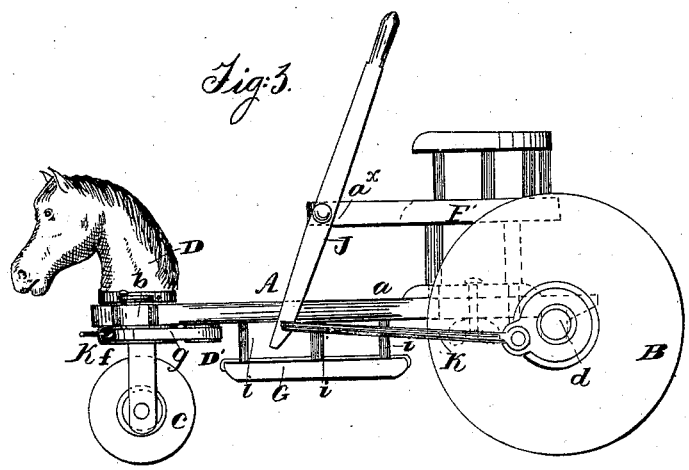
Figure 4:
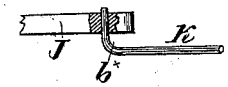

Figure 1, is a side sectional view of our invention, taken in the line $x$, $x$, Fig. 2. Fig. 2, a plan or top view of the same. Fig. 3, a side view of the same. Fig. 4, a detached sectional view of a portion of the propelling device.

Similar letters of reference indicate corresponding parts in the several figures.

The object of this invention is to combine, by a very simple arrangement, three different children's vehicles in one, so that any one of them may be used and answer equally as well as if made separately as heretofore, and the whole furnished at nearly as small a cost as the separate devices now made.

Children require different kinds of vehicles according to their age. Infants are drawn and shoved along in " carriages " and " perambulators " as they are technically termed, while older children propel themselves along in " velocipedes ". By combining these three devices in one a vehicle is obtained which may be used for several children of a family and one which may be adapted to the growth of a child, that is to say, changed from a " carriage " to a " perambulator " and from a perambulator to a " velocipede ".

The invention consists in applying to a frame which is mounted on three wheels, two behind and one in front, the latter being a caster wheel, a suspended platform, rear or back handles and a suitable body or seat provided when necessary with levers and connecting rods, all arranged substantially as hereinafter shown and described, to effect the desired object.

To enable those skilled in the art to fully understand and construct our invention, we will proceed to describe it.

A, represents a frame which is formed of two parallel bars $a$, $a$, connected by traverse bars $b$, $c$, $d$, the latter bar $d$, forming an axle at the back part of the frame for wheels B, B. The front part of the frame A, is supported by a caster wheel C, the shaft $e$, of which passes vertically through the traverse bar $b$, at the front end of the frame A, and has a carved figure D, representing the head of a horse, attached to it, above the bar $b$. The bar $b$, rests on a circular plate or shoulder $f$, on shaft $e$, said plate having a strap $g$, attached to its periphery the ends of which are secured to the ends of a lever D′, which is pivoted at its center to an arm $h$, of the cross-bar $b$. This lever D′, serves in certain cases as a means to turn the caster wheel under the action of the feet of the occupant of the device, as will be hereinafter referred to. To the carved figure D, a strap E, is attached, said strap having its ends secured to the ends of a bar $h$, which passes horizontally through the figure D, as shown clearly in Fig. 2.

On the back part of the frame A, a seat or body F, is secured at a point just in front of the traverse bar or axle $d$, and to the frame A, between the seat or body F, a platform G, is secured by pendants $i$, as shown clearly in Figs. 1, and 3. To the back part of the frame A, curved handles H, are attached, said handles extending up back of the seat or body F, and connected at their upper ends by a cross bar $j$, see Figs. 1, and 2.

To the front part of the circular plate or shoulder $f$, there is secured a staple $k$, in which a hook $l$, of a draft pole I, is fitted when the device is used as a carriage, see Figs. 1, and 2.

The device is technically termed a " carriage " when drawn by an attendant in front by means of the pole I. When thus used the strap E, may be adjusted back of the seat or body F, as shown in Fig. 1. The device it will be seen when used as a " carriage " may be readily guided or turned through the medium of the draft pole I, as the latter is attached to the plate or shoulder $f$, of the shaft $e$, of the caster wheel. The platform G, serves to support the feet of the occupant of the seat or body F. When the device is used as a " perambulator " the pole I, is detached and if the child be small the strap E, is used by the attendant to turn the caster wheel, while shoving the device along by the seat or back handles H. In case the child be old enough the strap E, is placed in its hands so that it may amuse itself by turning or guiding the device while the attendant shoves it along.

When the device is used as a "velocipede" a lever J, is secured by a pivot $a^x$, to each side of the front part of the seat or body F, and the lower ends of these levers have rods K, attached which are connected to the wheels B, B, at a short distance from their centers. When these levers are applied the device is used as a "velocipede" the caster wheel C, being turned by the application of the feet of the occupant of seat or body F, to the lever D'. If desired a seat or body F', as shown in Fig. 3, may be applied to the frame A, when the device is used as a "velocipede," said seat or body having the levers J, attached to it. This however is not essential as the levers J, may be readily applied to and detached from the seat or body F, and the connecting rods K, readily connected to and disconnected from the wheels B. The rods K, are bent at their front ends at right angles to their main portions, as shown at $b^x$, and these bent portions pass through the lower ends of the levers J, as shown clearly in Fig. 4. The ends $b^x$, cause the main portions of the rods K, to project out sufficiently so that they cannot interfere with the wheels, and the improvement is therefore rendered very compact in consequence of the levers being allowed to work quite close to the wheels B, a result which could not be attained were the rods K, bent or curved so as to pass between the levers J, and the wheels.

Thus it will be seen that the three different wheel vehicles for children's use are all combined in one, and by a very simple and economical means.

It is not essential that the shaft $e$, have any particular figure D, attached to it, the shaft $e$, may be long enough to project a suitable distance above the traverse bar $b$, to admit of a cross-piece and the strap E, being attached. The upper end of the shaft $e$, however should have an index attached to serve as a guide to the child in turning the caster. The head of the horse when used answers such a purpose.

Having thus described our invention, what we claim as new and desire to secure by Letters Patent, is:

1. The frame A, mounted on the wheels B, B, C, as shown with the suspended platform G, seat or body F, and rear or back handles H, attached, all being arranged and used in connection with pole I, or strap E, substantially as and for the purpose set forth.

2. In combination with the frame A, platform G, and seat or body F, the hand levers J, J, connecting rods K, K, and foot lever D, applied to the caster wheel C, as and for the purpose set forth.

3. The bending of the front ends $b^x$, of the connecting rods K, K, as described, to admit of the wheels B, B, and hand levers J, J, working in.

4. Extending the shaft $e$, above the traverse bar $b$, of the frame and having any suitable figure or index D, connected therewith above the traverse bar with strap E, connected to the index substantially as and for the purpose set forth.

BENJAMIN P. CRANDALL.
JACOB A. CONOVER.

Witnesses:
C. W. COWTAN,
M. M. LIVINGSTON.